(12) United States Patent
Sorin et al.

(10) Patent No.: US 12,392,647 B2
(45) Date of Patent: Aug. 19, 2025

(54) ELONGATED MICROSTRUCTURED CAPACITIVE SENSOR

(71) Applicant: ECOLE POLYTECHNIQUE FEDERALE DE LAUSANNE (EPFL), Lausanne (CH)

(72) Inventors: Fabien Sorin, St-Sulpice (CH); William Esposito, Genèva (CH); Véronique Michaud, St-Saphorin-sur-Morges (CH); Chaoqun Dong, Écublens (CH); Baris Çaglar, Lausanne (CH); Dang Tung Nguyen, Goleta, CA (US)

(73) Assignee: ECOLE POLYTECHNIQUE FEDERALE DE LAUSANNE (EPFL), Lausanne (CH)

( * ) Notice: Subject to any disclaimer, the term of this patent is extended or adjusted under 35 U.S.C. 154(b) by 438 days.

(21) Appl. No.: 17/638,654

(22) PCT Filed: Aug. 26, 2020

(86) PCT No.: PCT/IB2020/057957
§ 371 (c)(1),
(2) Date: Feb. 25, 2022

(87) PCT Pub. No.: WO2021/038456
PCT Pub. Date: Mar. 4, 2021

(65) Prior Publication Data
US 2022/0307878 A1    Sep. 29, 2022

(30) Foreign Application Priority Data

Aug. 27, 2019    (EP) ..................................... 19193949

(51) Int. Cl.
*G01F 1/56* (2006.01)
*B29D 11/00* (2006.01)
(Continued)

(52) U.S. Cl.
CPC .......... *G01F 1/56* (2013.01); *B29D 11/00721* (2013.01); *G01K 7/34* (2013.01); *G01L 1/142* (2013.01); *G01N 27/221* (2013.01)

(58) Field of Classification Search
CPC ....... G01F 1/56; B29D 11/00721; G01K 7/34; G01L 1/142; G01N 27/221
(Continued)

(56) References Cited

U.S. PATENT DOCUMENTS 6,376,971 B1    4/2002    Pelrine et al.
6,809,462 B2    10/2004    Pelrine et al.
(Continued)

FOREIGN PATENT DOCUMENTS

EP    2299585 A1    3/2011

OTHER PUBLICATIONS

EP Office Action dated Sep. 27, 2024 in application 20764166.3.
(Continued)

*Primary Examiner* — Peter J Macchiarolo
*Assistant Examiner* — John M Royston
(74) *Attorney, Agent, or Firm* — Maschoff Brennan

(57) ABSTRACT

The present invention concerns an elongated capacitive sensor for fluid monitoring. The sensor comprising: a fibre support made of a dielectric material or dielectric composite material; and a first electrode and a second electrode arranged longitudinally along the fibre support, the first and second electrodes forming together with the fibre support a capacitive sensing element whose capacitance is dependent upon one or more electrical properties of one or more materials inside the support and/or outside the support, and/or is dependent upon a change of materials configuration and associated overall change of one or more electrical properties inside the support and/or outside the support.

17 Claims, 13 Drawing Sheets

(51) Int. Cl.
 *G01K 7/34* (2006.01)
 *G01L 1/14* (2006.01)
 *G01N 27/22* (2006.01)

(58) Field of Classification Search
 USPC ................................................ 73/826.626
 See application file for complete search history.

(56) References Cited

U.S. PATENT DOCUMENTS

| | | | |
|---|---|---|---|
| 2002/0130673 A1 | 9/2002 | Pelrine et al. | |
| 2003/0024113 A1* | 2/2003 | Scher | G01L 1/205 29/830 |
| 2007/0164641 A1* | 7/2007 | Pelrine | A61M 5/14212 310/11 |
| 2011/0174082 A1* | 7/2011 | Achard | G01F 1/56 73/861.12 |
| 2019/0041880 A1* | 2/2019 | Grassi | G01N 15/06 |
| 2019/0204291 A1* | 7/2019 | Potyrailo | G01N 33/2888 |

OTHER PUBLICATIONS

Qu et al., "Superelastic Multimaterial Electronic and Photonic Fibers and Devices via Thermal Drawing," 2018.

Tung Nguyen-Dang et al, "Multi-material micro-electromechanical fibers with bendable functional domains", Mar. 7, 2017 (Mar. 7, 2017), vol. 50, No. 14, p. 144001.

Gabriele Chiesura et al, "RTM Production Monitoring of the A380 Hinge Arm Droop Nose Mechanism: A Multi-Sensor Approach", Sensors,vol. 16, No. 6, Jun. 14, 2016 (Jun. 14, 2016), p. 866.

Jian Feng Gu et al, "Soft capacitor fibers for electronic textiles", Sep. 30, 2010.

B. Chen, C. Kwok, T.-A. N. Nguyen, and Z. Wang, "Integrated Fiber Flow Sensors for Microfluidic Interconnects," Adv. Mater. Technol., vol. 3, No. 11, p. 1800175, 2018. Please let us know if you need any copies of these documents.

* cited by examiner

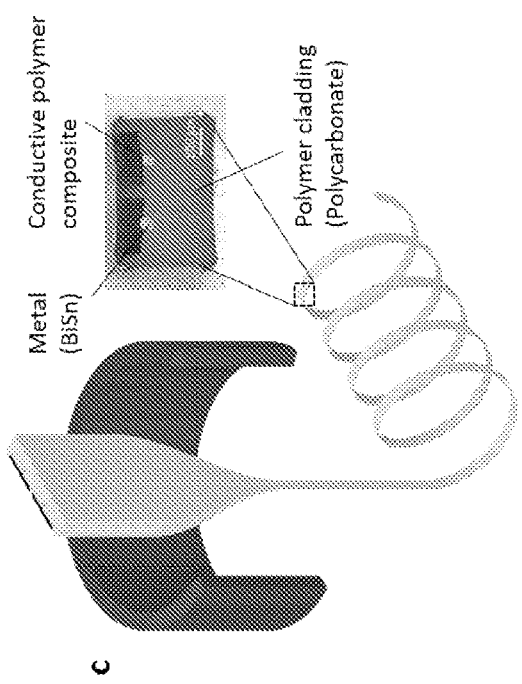
Fig. 5A
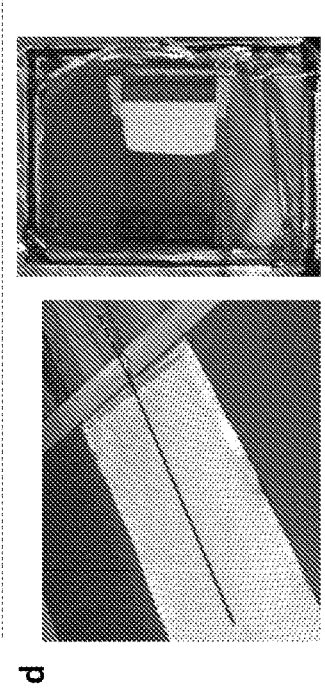
Fig. 5C
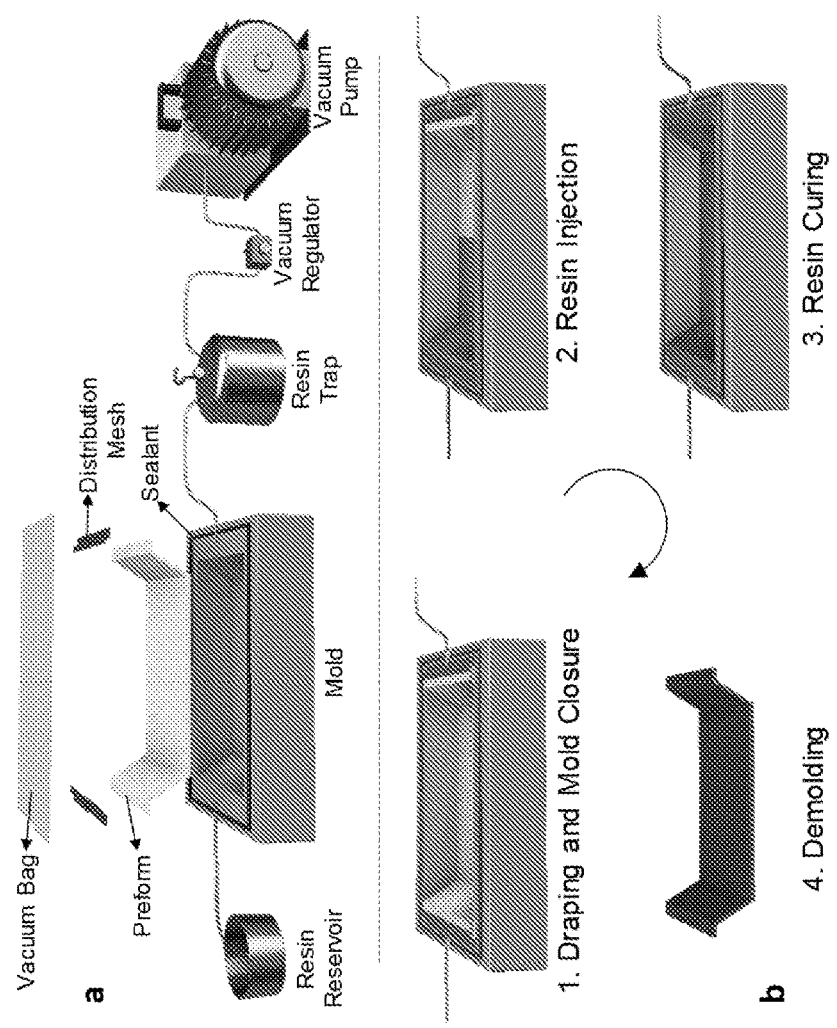
Fig. 5B
Fig. 5D

ELONGATED MICROSTRUCTURED CAPACITIVE SENSOR

TECHNICAL FIELD

The present invention relates to fibre capacitive sensors, which may be used for flow monitoring of a fluid and/or for measuring humidity. The fibre capacitive sensors may also optionally comprise other types of sensors for strain and/or temperature. The present invention also relates to a sensor system comprising one or more fibre capacitive sensors. The present invention equally relates to a fabrication process of a fibre capacitive sensor.

BACKGROUND OF THE INVENTION

Depending on the application, liquid or gas flows can be measured directly or indirectly in a variety of different ways. Most of them require either mechanical interaction (turbines), thermal (and thus heating of the fluid) or pressure sensors, at discrete locations along a pipeline.

Integrated microfluidic systems are being increasingly exploited in a variety of fields, such as the biochemical, clinical, and pharmaceutical sectors, due in large part to the recent advances of "lab-on-chip" and other miniaturisation strategies. In particular, microflow sensors that are able to measure very low flow rates and perform quantitative analysis of fluids are becoming increasingly important components for precise process control and fluid monitoring. Applications include analytical chemistry, drug delivery, fuel meters, and blood flow monitoring. To date, flow monitoring has relied on different operating principles including heat transfer, drag-force, or pressure-induced variations in electrical and optical parameters. The most widely reported devices are thermal-based flow sensors, which rely on the heat transfer between a source and a detector separated by a moving fluid. While these sensors can measure changing flow rates, they may suffer from various limitations, such as the requirement of pure liquids as impurities can affect heat transfer and measurement accuracy, or the need to heat the fluid, which is restricting for applications in biology and drug release. Micro thermal flow sensors are also vulnerable to thermal losses caused by other heat transfer pathways, such as through substrates or electrical leads. Moreover, as with other methods, it is quite challenging to detect very low flow rates, and devices are typically only good for the detection of flow rates within a narrow range.

Capacitive sensors allow the circumvention of some of these limitations, and they constitute a powerful alternative flow-monitoring scheme for many applications. Relying on the change of capacitance of a micro-channel as it is being filled by the sampled liquid, they allow for accurate measurements of a wide range of flow rates. They also enable the extraction of the dielectric constant (also known as relative permittivity) of the fluid, which can provide information about its composition. Thus far, however, the fabrication of capacitive sensors has resulted in bulky systems, or has required complex lithography processes to integrate conducting electrodes alongside micro-channels. Fibre processing techniques have recently emerged as an ideal platform to integrate a variety of materials alongside microstructured channels, for applications in neuroscience, optics or microfluidics.

Flow monitoring is also often needed in resin transfer moulding (RTM). RTM as part of the more general liquid composite moulding (LCM) family of composite processes, is used to produce high quality composite parts in a wide range of industries, from aerospace to automobile. The technique consists of infiltrating resin into a mould already containing a fibre reinforcement (glass, carbon, natural fibres, etc.) assembled as a textile, and then to cure the resin to harden the part including the textile. Millions of parts are produced every day, triggering a strong interest in optimising the fabrication process, without compromising part quality. "Online monitoring" of resin flow and "race tracking" modelling ("race tracking" referring to potential uncontrolled side flow) are methods developed to correct the flow front of the resin as it is infiltrated, minimising the amount of time required for impregnation and avoiding dry spots. Many types of sensors have been assessed for such purposes. They require accessing a physical parameter related to the presence of resin, such as pressure, heat, or optical reflexion/transmission for transparent moulds (which is not the general case in industrial practice). The measurement can be done in situ, at the surface of the mould, or outside it, depending on the required spatial resolution and whether the sensor can be disposed of after being impregnated with resin. For in situ sensing over the length of the composite, to our knowledge, the existing solutions fail to provide a reliable measurement that is electrically insulated from carbon fibres, and which are robust (glass fibre optic sensors are known to be very brittle) and small enough not to impact mechanical properties. Moreover, most sensor implementations do not allow modification of the mould or LCM preform without redesigning the sensing layout.

SUMMARY OF THE INVENTION

It is an object of the present invention to overcome at least some of the above problems related to flow sensing solutions.

According to a first aspect of the invention, there is provided a capacitive sensor.

The proposed new solution has the advantage that the proposed capacitive microflow sensor is able to provide precise measurements with short response times and low power consumption.

According to a second aspect of the invention, there is provided a capacitive sensor system comprising the capacitive sensor according to the first aspect of the invention, and further comprising a measuring device or instrument, such as an impedance analyser.

According to a third aspect of the invention, there is provided a part preform for a resin transfer moulding process, the part preform comprising the capacitive sensor according to the first aspect of the present invention, and wherein the part preform comprises at least a first material layer and a second material layer such that the capacitive sensor is placed or sandwiched between the first and second material layers. The first and second material layers may or may not be of the same material.

According to a fourth aspect of the invention, there is provided a part preform system comprising the part preform according to the third aspect of the present invention, and wherein the part preform system further comprises a processing circuit for determining a resin flow front location and/or a resin curing degree.

According to a fifth aspect of the invention, there is provided a method of monitoring a fluid flow by using the capacitive sensor according to the first aspect of the invention, wherein the method comprises determining a fluid flow parameter or a fluid-related parameter based on a measured capacitance value of a capacitive sensing element.

According to a sixth aspect of the invention, there is provided a method of fabricating a fibre capacitive sensor for fluid monitoring.

The proposed process entails similar innovative fabrication strategies and designs as advanced fibre fabrication processes to implement advanced sensing systems at high scalability, in compact forms, and offering low-cost disposability.

Other aspects of the invention are recited in the dependent claims attached hereto.

BRIEF DESCRIPTION OF THE DRAWINGS

Other features and advantages of the invention will become apparent from the following description of non-limiting example embodiments, with reference to the appended drawings, in which:

FIGS. 5A to 5D illustrate an example fibre sensor design, fabrication and integration in a vacuum assisted resin transfer moulding (RTM) process according to the second embodiment of the present invention;

DETAILED DESCRIPTION OF AN EMBODIMENT OF THE INVENTION

Figure 1C:
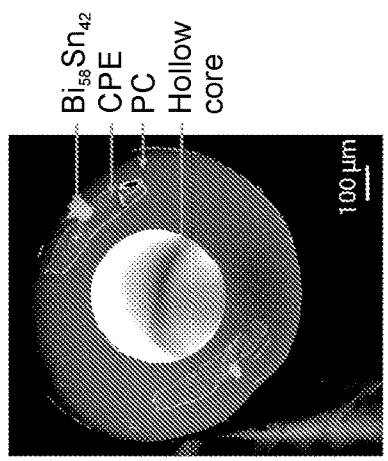
FIGS. 1A to 1D illustrate an example fabrication process of a fibre-like capacitive sensor and the resulting sensor according to a first embodiment of the present invention.

Some embodiments of the present invention will now be described in detail with reference to the attached figures. The embodiments are described in the context of measuring fluid flow rates in a sensor system. However, the teachings of the invention are not limited to this environment. Identical or corresponding functional and structural elements which appear in the different drawings are assigned the same reference numerals.

The proposed embodiments disclose novel microstructured capacitive sensors in a fibre-like, elongated form that can sense flow progression, flow rate and/or give information about the fluid properties in a variety of configurations. The proposed capacitive sensor may, in addition to or instead of being used for sensing the above properties, be used for detecting the presence (or absence) of any object in the vicinity of the capacitive sensor different from the air. This means that it can also be used as a proximity sensor (as the capacitance of the capacitive sensor depends on the distance to an object in the vicinity of the capacitive sensor) or as a humidity sensor (as the capacitance of the capacitive sensor depends on the humidity in the vicinity of the capacitive sensor). In fact, as explained later, any change of the dielectric constant of a material, such as a fluid, around or inside the capacitive sensor can change the capacitance of the capacitive sensor. Furthermore, as explained below, the capacitive sensor may also be used for sensing temperature and/or strain, for instance, although possibly via other embedded sensors relying on different detection mechanisms. In the present description, a fibre may be defined to be an object that is significantly longer than it is wide, in other words, the object has a high aspect ratio. The aspect ratio may thus be at least 10, 100 or 1000 (the length of the object divided by its greatest cross-sectional dimension, the cross section being measured substantially orthogonally to the length axis of the object). Capacitive sensing of a permittivity variation is an elegant and non-disruptive way of sampling flow front position at a fast acquisition rate, and fluid composition. In electromagnetism, absolute permittivity, often simply called permittivity, is the measure of capacitance that is encountered when forming an electric field in a particular medium. More specifically, permittivity describes the amount of charge that is required to generate one unit of electric flux in a given medium. A charge yields more electric flux in a medium with low permittivity than in a medium with high permittivity. In other words, permittivity is the measure of a material's ability to store an electric field in the polarisation of the medium.

The present invention proposes a multimaterial fibre-shaped apparatus or device (also simply referred to as a fibre) whose cross section (taken substantially orthogonally to the longitudinal axis of the device) can be microstructured with several materials and shaped to be deployed in a variety of configurations. The fluid to be sensed can flow inside one or more microchannels embedded in the fibre, or around the fibre that has exposed sensing elements (i.e. electrodes) on its surface, or embedded sensing elements close to the surface. The microchannels have a cross-sectional diameter between 50 µm and 5 mm or more specifically between 50 µm and 0.5 mm. If the fibre has only one channel, then the cross section of the entire fibre may be between 10% and 500%, or more specifically between 20% and 200% greater than the cross section of the channel. The fibre devices can have various shapes: an elongated device with circular, oval or rectangular cross section, a device with a hollow core, a substantially U-shaped device, etc. Sensing can occur along a portion or the entire length of the device, which can be freely extended. Its cladding, which may be polymer cladding, can encapsulate other functionalities, such as thermal and strain sensing, forming multifunctional elongated flow sensors. Fabricated by thermal drawing for instance, these benefit from the costs traditionally associated with conventional optical fibre production. Such costs allow using the fibre as "disposable", meaning it can be embedded within a part or used for contaminated samples. The longitudinal design allows covering large distances and surfaces continuously, as opposed to an array of point sensors, which imply discrete measurements and numerous electrical connections. The fibre's flexibility allows bending and following a pipeline shape, integrating the fibre within fabrics and technical textiles, or integrating the fibre in microfluidics and drug delivery systems. It is further to be noted that the fibre can also be cut into a large number of small devices to be integrated in smaller systems, again benefiting from the scalability of the fabrication technique.

The present description comprises two embodiments. A first embodiment in the described example is based on the flow monitoring inside a hollow-core fibre, and a second embodiment in the described example is based on the flow monitoring and curing monitoring of a resin to make and functionalise composite parts that could sense strain, temperature, humidity and/or object proximity. The first embodiment covers the whole field of microfluidics and drug delivery as a unique, miniaturised tool to make precise sensing of flow, quantity and fluid type. The second embodiment impacts the field of liquid composite moulding (LCM) as cheap elongated multifunctional sensors can be embedded in part preforms during the manufacturing phase allowing monitoring and/or functionalising the part. The present invention brings potential benefits to a wide range of fluid processes, optimising and gaining new insights into research and development and industrial procedures, leading to added precision, time saving and extra functionalities for manufactured parts. It is to be noted that both the first and second embodiments relate to microflow sensors in a fibre form. The described examples do not limit the fields of applications in other areas, such as pipelines, food industry, etc.

First Embodiment

The first embodiment relates to a monolithic capacitive fibre-based device or sensor 1 for microflow sensing, which may be fabricated by using the multi-material fibre drawing technology. The fibre device comprises an encapsulated micro-channel 3 or a channel for liquid flow in a cladding 5, in this example a polymeric cladding, with embedded electrodes, in this example comprising a polymer composite structure 7 (conducting composite) that form a capacitive structure, and a metal contact 9. It will be shown that this fibre device can measure the location of the fluid front and the flow rate, and can determine the static dielectric constant of the fluid flowing inside the micro-channel 3. The functional fibre shows a broad operating frequency range as a capacitive device, up to 2 MHz. The fibre also shows an unusually wide dynamic flow rate detection range varying over six orders of magnitude (nL min$^{-1}$ to mL min$^{-1}$). This measurement range can be tuned and extended in a straightforward manner by changing the geometric configuration of the preform to be drawn, and hence the resulting fibre. The simple design and scalability of the manufacturing method enables the fabrication of kilometres of fibre devices that can be cut into millions of centimetres-long flexible and functional capillaries in an efficient and low-cost manner. It opens novel opportunities for flow monitoring systems in a variety of configurations at the cost and scalability traditionally associated with fibre processes.

Figure 1D:
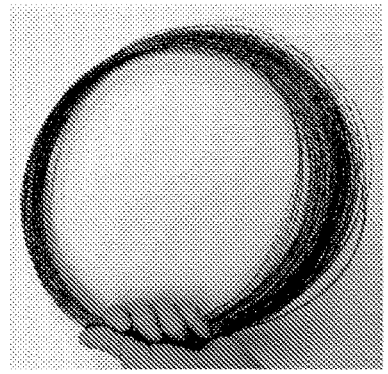
Figure 1B:
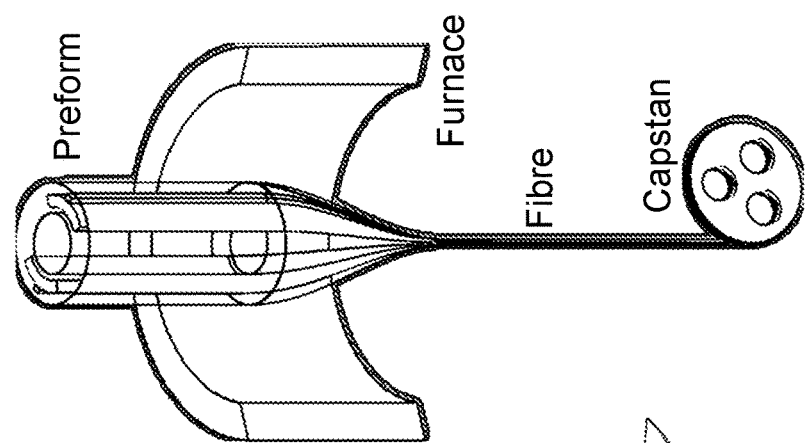
Figure 1A:
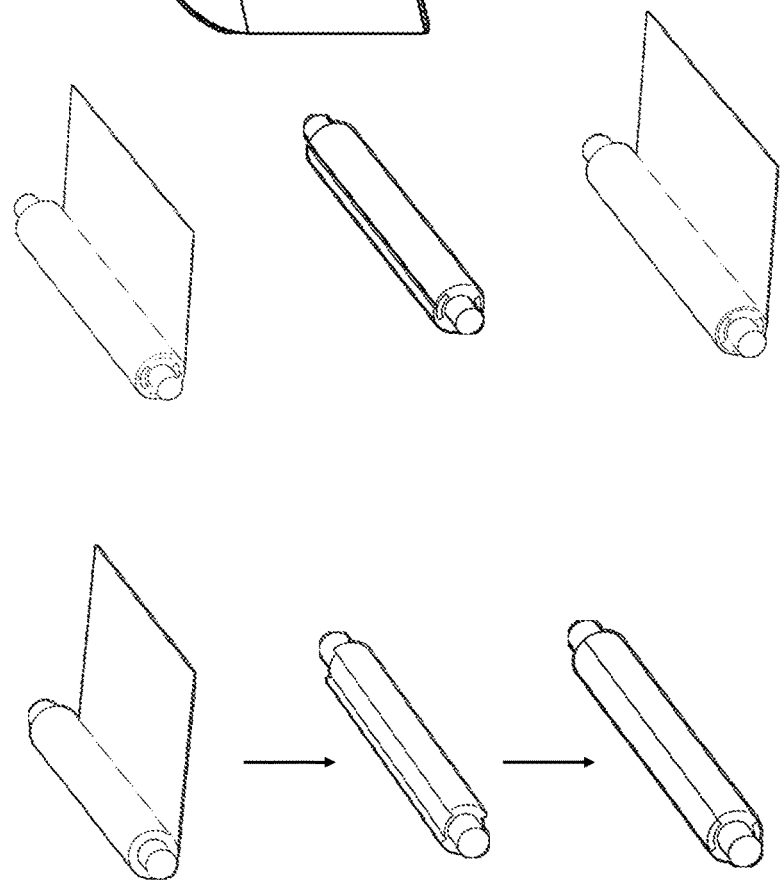

In the present example, the capacitive fibre is fabricated by using a preform-to-fibre thermal drawing process, as shown schematically in FIGS. 1A and 1B. It begins with the construction of a multi-material macroscopic preform, via a series of simple machining techniques (FIG. 1A). The fibre design comprises a hollow base, cladding or support element, or simply a support 5, comprising a channel 3 or tunnel extending longitudinally through the fibre. The fibre-like or fibre support comprises two integrated conducting polymer nano-composite electrodes 7 (forming a first electrode component or part made for instance of conductive elastomeric or thermoplastic polymer) extending longitudinally along the support 5. The support thus forms a polymeric cladding for the channel 3 and also for the electrodes. Polycarbonate (PC) is selected as the support or encapsulating material, which enables the continuous deformation of the preform at a relatively high viscosity. Polycarbonates form a group of thermoplastic polymers containing carbonate groups in their chemical structures. Polycarbonates that are used in engineering are strong, tough materials, and some grades are optically transparent. They can be easily worked, moulded, and thermoformed. In this example, the electrodes are made of carbon-black-loaded polyethylene (CPE, also called conductive polyethylene) because it is a material compatible with the thermal drawing process that can keep the desired shape to form the required semi-circular (when referring to the shape of the cross section substantially orthogonal to the length axis of the fibre) capacitor geometry. In this example, each of the electrodes also comprises a second component 9 different from the first component 7. In this example, the second components comprise a respective eutectic element (i.e. metallic element), and more specifically $Bi_{58}Sn_{42}$ eutectic ($T_m = 139°$ C.) element, in contact with the respective first electrode component 7 (forming a CPE domain) to enhance the conductivity along the length axis and thus improve the device response time. The word eutectic relates to or denotes a mixture of substances (in fixed proportions) that melts and freezes at a single temperature that is lower than the melting points of the separate constituents or of any other mixture of them.

The first and second electrodes are isolated from the channel 3 by a PC layer (the support) to avoid deterioration, surface contact effects, and leakage currents. This PC layer is chosen to be thin enough to minimise the impact on the measurement as discussed below, while ensuring the integrity of the structure. The assembly is subsequently fed into a draw tower and heated over its glass transition temperature. As the viscosity of the materials decreases by several orders of magnitude, the bottom region of the preform is then stretched (drawn) to yield a long, thin, and axially-invariant fibre (FIGS. 1B and 1C). The fibre maintains the composition and cross-sectional architecture of the initial preform, but with reduced transverse dimensions and an extended length. FIG. 1D shows an 80 m-long uniform fibre that was produced from a single draw, which corresponds to 4000 2 cm-long functional capillaries. It is to be noted that industrial production results in tens-of-kilometres of fibre length, highlighting the scalability of this process. As a proof-of-concept, a fibre device is next characterised with a diameter of the channel of around 400 μm, which would fit syringe needle sizes and could be used as an integrated microflow meter for drug delivery monitoring.

Figure 2A:
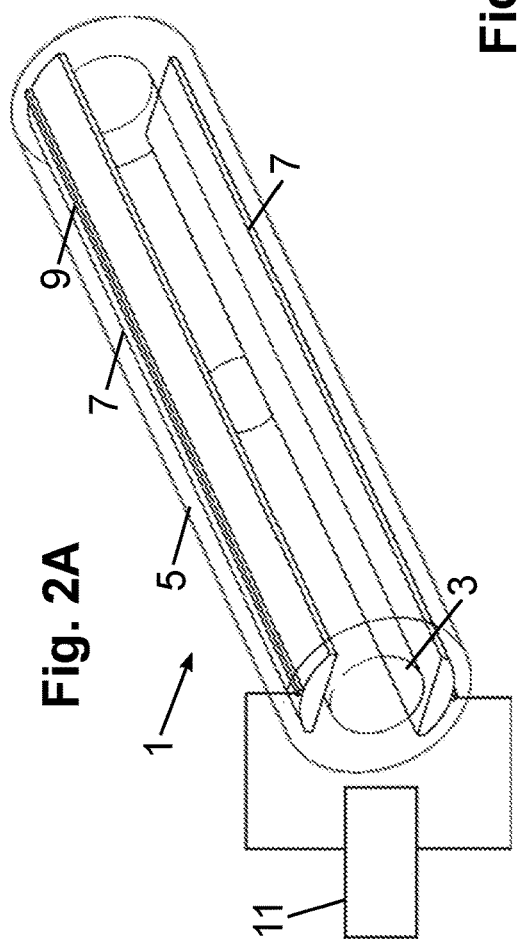
FIG. 2A is a perspective view of the hollow-core fibre sensor according to the first embodiment of the present invention when the sensor is in operation.

The working principle of the fibre device 1 is illustrated in FIG. 2A. The hollow support acts as a microfluidic channel 3 through which a liquid flows. The two electrodes along the channel, together with the in-between dielectric medium 5 (i.e. the support), form a capacitor. The current leakage of the fibre capacitor can be considered negligible, given the thickness of the PC layer. The equivalent circuit may then be made of a resistance arising from the two electrodes and the involved electrical contacts, and three capacitances in series formed by the two PC layers between the two electrodes and the hollow channel, and the channel itself. As the fluid is flowing inside the channel 3, the dielectric constant of the channel changes, which results in a measurable change of the equivalent capacitance, from which the dielectric constant and flow rate of the moving fluid can be extracted. As is shown in FIG. 2A, the two electrodes, and more specifically the metallic ribbons, i.e. the metal electrode components 9 are connected to a capacitance measurement circuit or unit 11, in this example an impedance analyser, while a liquid flows inside the hollow microchannel 3. Capacitance can then be indirectly determined from the measured impedance value.

Figure 2B:
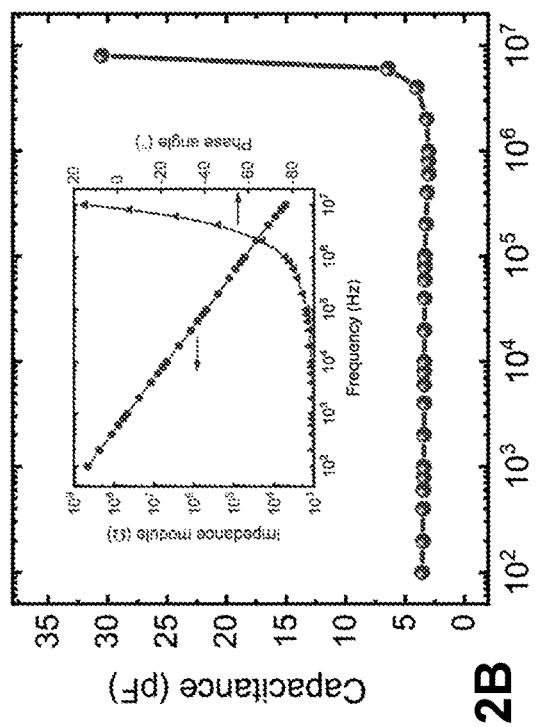
FIG. 2B shows a plot illustrating the calculated capacitance of the fibre under various frequencies, based upon an equivalent series circuit composed of ideal resistors and capacitors. The inset shows its impedance module and phase spectra, exhibiting a definite capacitive behaviour at a broad operative frequency range.
Figure 2C:
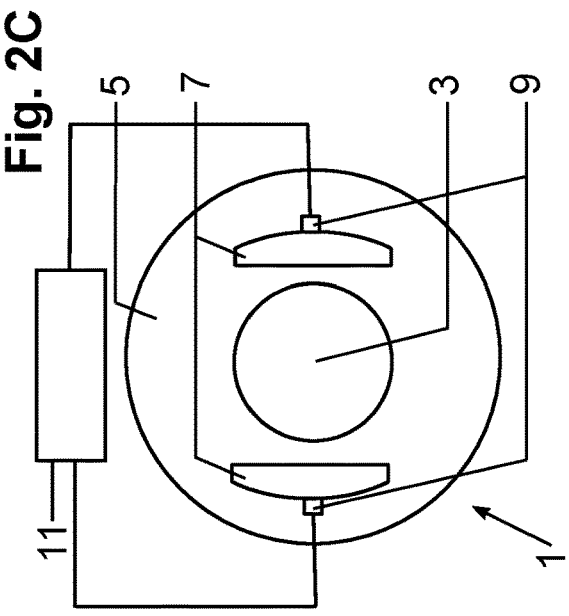
FIG. 2C is a cross-sectional view of the capacitive sensor according to the first embodiment of the present invention and further showing an impedance analyser.
Figure 2D:
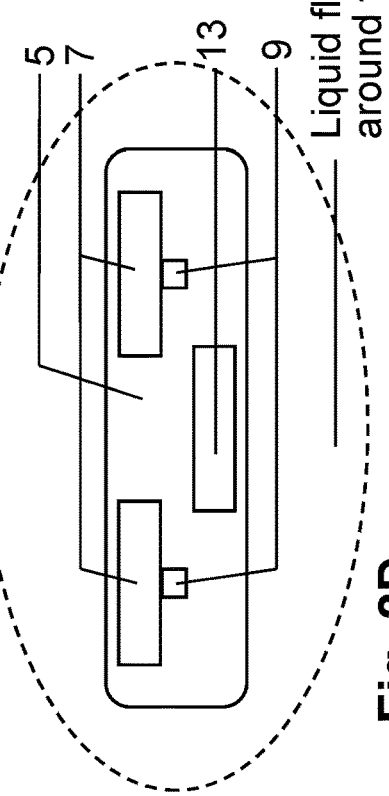
FIG. 2D is a cross-sectional view of the capacitive sensor according to a second embodiment of the present invention.

In order to gain more insight into the capacitive behaviour of this fibre device 1, its electrical impedance response with respect to the frequency of the applied voltage was first characterised. FIG. 2B shows the calculated capacitance of the fibre under various frequencies, based upon an equivalent series circuit composed of ideal resistors and capacitors. The inset shows its impedance module and phase spectra, exhibiting a definite capacitive behaviour at a broad operative frequency range. The inset in FIG. 2B thus presents the impedance module (|Z|) and phase shift between voltage and current (θ) at various frequencies (f) from 100 Hz to 10 MHz. It exhibits the expected behaviour of an ideal capacitor up to around 2 MHz, beyond which the dissipation factor reaches 50% due to parasitic series resistance, inductive reactance, and current leakage. The series resistance extracted from this measurement is 6.7 kΩ, and from the measured capacitance shown in FIG. 2B, the RC time constant of the circuit can be extracted, which is 23 ns. The large range of operating frequencies enables the measurement of the capacitance of the fibre devices at a much higher bandwidth compared with typical time scales associated with microfluidics. In particular, it allows the fibre capacitance to be sampled over time as the fluid is flowing, which in turn will inform on the flow rate, as will be shown below.

Figure 3A:
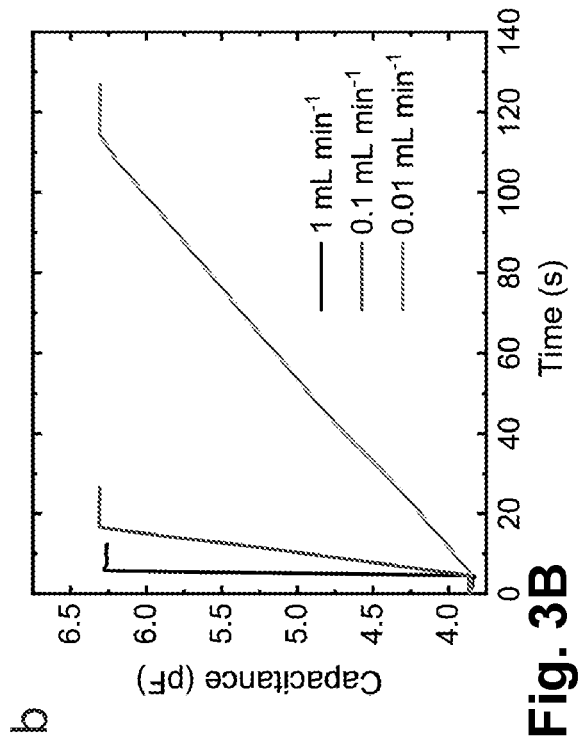
FIGS. 3A to 3D are plots showing some example flow rate detection values or related values obtained by using the proposed sensor of the first embodiment.

To understand and predict the change of capacitance of the fibre device as a liquid flows within its hollow channel 3, its behaviour was modelled via finite element techniques using COMSOL®. In particular, we modelled the electrical response of a 1 cm-long fibre as its hollow core was filled with water. The applied voltage between the two electrodes was 1 V. The obtained capacitance, and electric potential distributions were calculated using the electrostatics module, assuming no charge build-up at interfaces. As shown in FIG. 3A, the simulated capacitance exhibits a linear increase as the flow distance (the distance travelled by the fluid front) increases, which should enable the extraction of both the location of the fluid front and its dielectric constant. To confirm this analysis experimentally, deionised water (DI water) was injected into a short fibre (4.5 cm in length) with different flow rates and its capacitance response was simultaneously recorded (FIG. 3B). The initial capacitance of the fibre is stable at 3.9 pF, after which it increases linearly with the continuous injection of fluid. It stabilises at 6.3 pF as the channel is fully filled with water. As the flow rate changes from 1 mL min$^{-1}$ to 0.1 mL min$^{-1}$ and further to 0.01 mL min$^{-1}$, the capacitance response as a function of the flowing time varies accordingly. The final capacitance measured is however still the same as expected, from which the dielectric constant of the liquid can be extracted as explained below. The flow rate (v) can also be deduced in real-time from the slope of capacitance change (k) with time. The relationship between $\log_{10}$ k and $\log_{10}$ v in FIG. 3C can be fitted with high accuracy:

$$\log_{10}k = 1.006 \log_{10}v + 0.302, r_2 = 0.999, \quad (1)$$

which enables the precise extraction of the flow rate over an unusual wide range of rates from 50 nL min$^{-1}$ to 10 mL min$^{-1}$, which is far beyond that of other reported microflowmeter devices. In the equation, r denotes a coefficient of determination. FIG. 3D shows the capacitive response of a longer fibre with the successive flowrate change of DI water from 10 μL min$^{-1}$ to 10 mL min$^{-1}$. Upon each injection, the capacitance increases linearly with featured slopes and remains steady when the injection is suspended. The varied slope strongly depends on the applied flow rate with a well-defined proportional relationship, as revealed in the inset. It is to be noted that the maximum flow rate could be further extended by increasing the accuracy and the data acquisition speed of the measurement system.

Figure 3C:
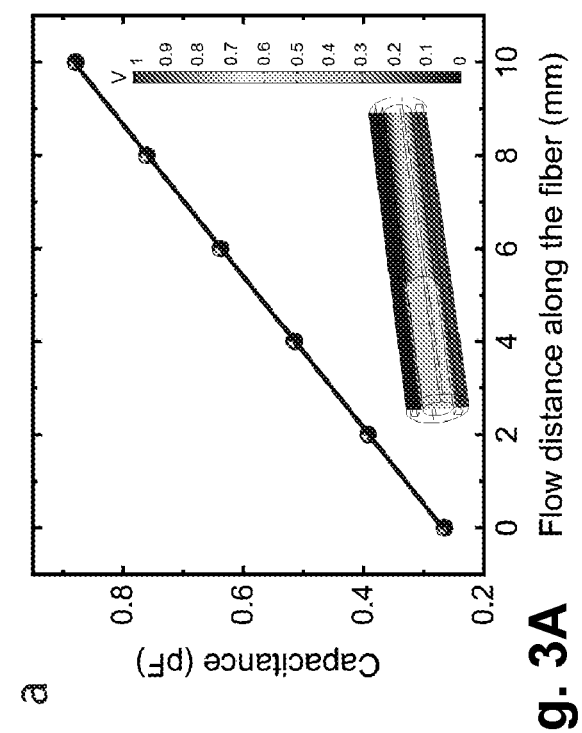
Figure 3B:
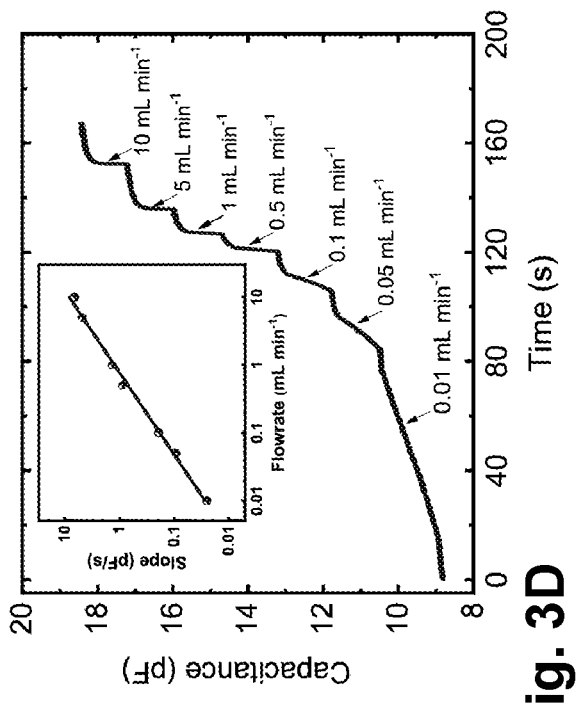
Figure 3D:
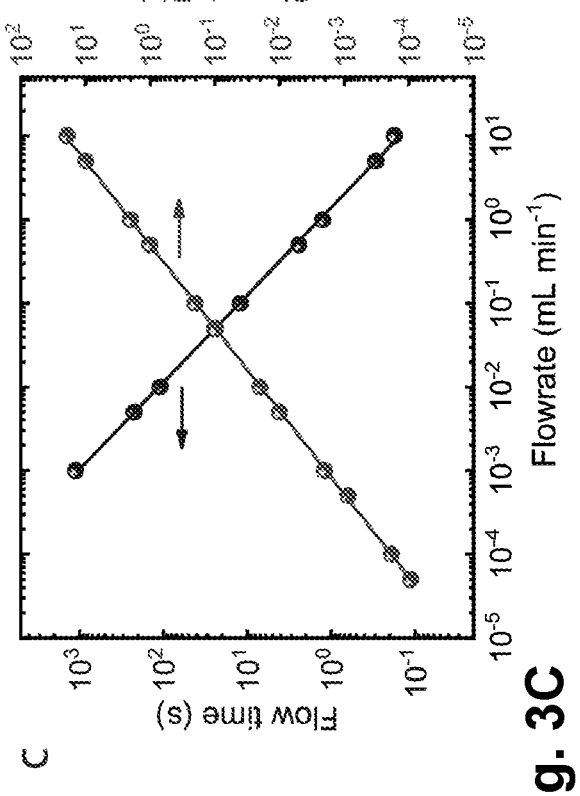

FIGS. 3A to 3D summarise experimentally the flow rate detection or their related example values. FIG. 3A illustrates finite element simulation of the capacitive response of a 1 cm-long fibre to the flow of liquid in the channel. The inset shows the electric potential distribution of the fibre, where the darker portion on the left indicates water filling the channel. FIG. 3B illustrates experimental capacitive response of a ~4.5 cm-long fibre to the injection of DI water with different flowrates of 0.01, 0.1, and 1 mL min$^{-1}$. FIG. 3C illustrates flow rate detection based upon the recording of flow time and the slope analysis of the capacitance vs. time curve. FIG. 3D illustrates typical capacitive response of a fibre-integrated micro-flowmeter to the flow with significantly varied flow rates ranging from 0.01 to 10 mL min$^{-1}$. The corresponding slope analysis is shown in the inset.

Figure 4A:
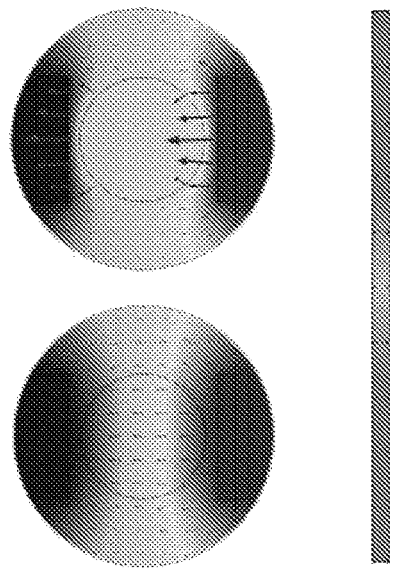
FIGS. 4A to 4D are plots illustrating static dielectric constant detection of a fluid flowing within the proposed sensor of the first embodiment.
Figure 4B:
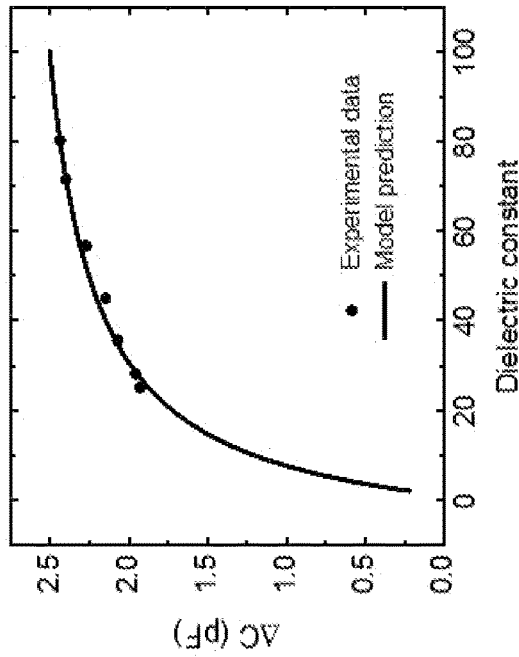

The capacitive fibre-based capillary approach can also extract the dielectric constant of the flowing fluid. The fibre was characterised by recording its capacitance with the injection of different liquids (acetic acid, ethanol and DI water) at the same flow rate, as shown in FIG. 4A. In order to avoid the influence of noise and electric double layers formed by the free ions in the liquids at lower frequencies, and inductive reactance at higher frequencies, the characterisation was done at 100 kHz. As expected, the three curves show distinct increasing trends and achieve different capacitance values when the channel of the fibre is fully filled, increasing their capacitance to 0.9, 1.9, and 2.4 pF for acetic acid, ethanol, and DI water, respectively. As the static dielectric constant of the material inside the channel varies from 1 to 80, the simulated electric field intensity of the channel reduces dramatically (FIG. 4B).

Figure 4C:
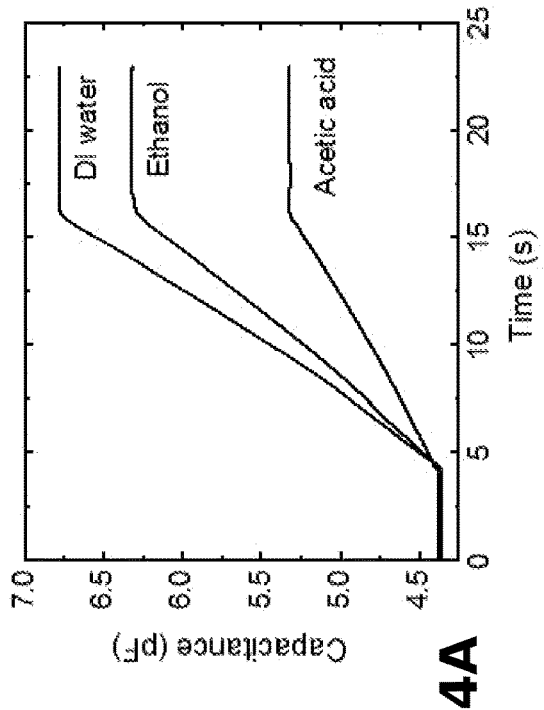
Figure 4D:
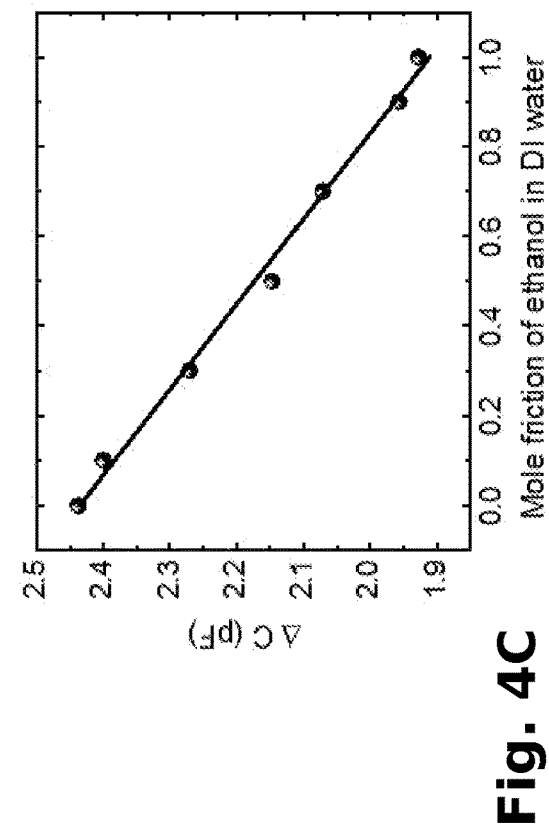

To illustrate the ability of capacitive fibres to characterise flowing liquids, the fibre was characterised by recording its capacitive response with respect to ethanol/DI water mixture solutions with various concentrations. DI water has a high dielectric constant of 80.3 at this frequency and room temperature, whereas ethanol has a lower value of 25.2. When mixed, the evaluation of the dielectric constant enables the determination of the mixing ratio of two liquids, which could be employed as a predictive tool in a variety of fields including pharmaceutical and drug delivery. For example, the approximate dielectric constant is regarded as a basis for blending solvent mixtures for new drug formulations. As shown in FIG. 4C, the capacitive response decreases with the increasing mole fraction of ethanol in DI water. We assume a typical dielectric relationship given by:

$$\ln\varepsilon_m = \varphi_1 \ln\varepsilon_1 + \varphi_2 \ln\varepsilon_2, \qquad (2)$$

where $\varepsilon_m$, $\varepsilon_1$ and $\varepsilon_2$ are the dielectric constants of the mixture, solvents 1 and 2 respectively, and $\varphi_1$ and $\varphi_2$ are the mole fractions of solvents 1 and 2. Combining this formula and the obtained experimental results, the relationship between the capacitive response of the fibre and the dielectric constant of the ethanol/DI water mixtures could be measured. The experimental results are shown in FIG. 4D, together with the fitted curve realised by finite element simulation. The capacitive fibre can extract the mixture compositions of arbitrary liquids with high accuracy, regardless of the flow rate. While the polycarbonate layer used here can be well-adapted for most liquid sampling, it can be changed to another thermoplastic to avoid reaction with sampled liquid that could react with PC and impair the well-functioning of the device. These results pave the way for a multi-functional capillary for flow rate and liquid analysis capabilities fabricated at the scale and cost traditionally associated with polymer fibres.

FIGS. 4A to 4D summarise the static dielectric constant detection. FIG. 4A illustrates a capacitive response of the fibre to the flow of different liquids (acetic acid, ethanol and DI water) with the same flowrate of 0.1 mL min$^{-1}$. FIG. 4B illustrates finite element simulation of the electric potential distribution of the fibre. The material in the channel is assigned with different dielectric constants (left: $\varepsilon=1$, right: $\varepsilon=80$). FIG. 4C illustrates capacitance change of the fibre with varied mole fraction of ethanol in DI water. FIG. 4D illustrates experimental and simulated capacitance change as a function of static dielectric constant.

In summary, we have demonstrated a simple and scalable platform for the fabrication of capillary-like multi-material fibre devices 1 for microfluidic sensing using the preform-to-fibre technique. We introduced an encapsulated micro-channel 3 in a polymeric cladding 5, together with embedded electrodes 7, 9 to form a monolithic capacitive system within the fibre configuration. It was shown that the fibre construct is highly sensitive to the dielectric constant change of the micro-channel region, enabling not only the monitoring of the presence and travel distance of a fluid inside the channel, but also the measurement of the real-time flow rate and the static dielectric constant of the fluid. As a capacitive device, the fibre shows a broad operative frequency range from 100 Hz up to 2 MHz, and is capable of sensing liquids with a very wide flow rate range—from 50 nL min$^{-1}$ to 10 mL min$^{-1}$—with high resolution. The fabrication process is extremely simple and scalable, and can potentially yield tens of kilometres of functional fibres in a short time. For example, in the case of 1 cm-long fibres as plugs for syringes, this amounts to the fabrication of millions of such devices in a scalable, fast and continuous process. Such multi-functional fibre architecture is envisioned to have promising applications in the handling of complex microfluidics in a reliable, accurate, and cost-effective way. The miniature and flexible feature endows capacitive fibres with practical portability, and could contribute to the further development of "lab-on-fibre" devices.

To fabricate the preform, a PC film was first rolled around a rod, which in this example is a Teflon® film-wrapped ceramic rod (1 cm in diameter). After consolidation at a high temperature for a given duration, in this example at 190° C. for 15 min, the obtained PC cylinder was milled to proper grooves for the introduction of the two carbon-black-doped polyethylene (CPE) plates. After this, more PC films were rolled around the rod and thus also around the CPE plates. Grooves were subsequently made for the $Bi_{58}Sn_{42}$ ribbons at prescribed positions. Once the ribbons have been placed in their positions to be in contact with the CPE plates, more PC film was rolled around the structure. In other words, another layer of PC was rolled outside the cylinder and consolidated, enabling the full encapsulation (longitudinally) of the electrodes. The CPE plates were fabricated by hot-pressing CPE films at a given temperature and for a given duration, in this example at 120° C. for 15 min under a given pressure, in this example under a pressure of 0.5 bar (50 k Pa), using a press. The ceramic rod was subsequently mechanically removed. The assembly was then thermally drawn in a typical three-zone draw tower, where the top, middle and bottom zones were heated to different temperatures, in this example to 120° C., 265° C., and 90° C. respectively. The preform was fed into a furnace at a speed of between 1 mm min$^{-1}$ and 1.5 mm min$^{-1}$. The fibre drawing speed was varied between 0.1 m min$^{-1}$ and 2.4 m min$^{-1}$ to result in a controllable preform-to-fibre draw-down ratio from 10 to 40 for obtaining an 80 m-long fibre.

A scanning electron microscope (SEM) image showing the cross section of the fibre was taken with a field emission SEM operating at 3.0 kV with a probe current of 120 pA. For the microfluidic characterisation, the electrical contact of the fibre was realised by stripping away two small regions of PC cladding to expose the $Bi_{58}Sn_{42}$ components, and connecting to external metallic, such as copper, wires with silver paint. Commercial syringe needles (400 µm in diameter) were inserted into the channel from two ends of the fibre, with epoxy resin for immobilisation and sealing. The size of the fibre channel was designed to exactly match the outer diameter of the needles. This avoids the potential problem of the two electrodes being short-circuited by the injected conductive liquid (e.g. water). The injection of the targeted liquids was precisely controlled by a syringe pump. A lock-in amplifier in connection with a current amplifier was used for the impedance measurements. An alternating current (AC) voltage with the amplitude of 1 V was applied to the fibre for the test. The capacitances were calculated from the impedance results, based upon an equivalent series circuit composed of ideal resistors and capacitors.

Second Embodiment

The second embodiment demonstrates a novel design of advanced fibre-based sensors that can continuously monitor in-situ the flow front of resin, its degree of curing, and can be used post manufacturing for embedded temperature and strain sensing, at low cost. The fibre sensors can easily be placed in a part preform, woven into a textile, and integrated inside a composite. Indeed, it will be shown that the second embodiment can minimise the disturbance to the flow caused by small resin channels around the sensing fibre, and that the measurement is independent of the flow rate. Integrating these fibres into liquid composite moulding (LCM) processes, we therefore provide a cheap, minimally invasive lineal embedded sensing platform for RTM monitoring and post manufacturing functionalisation of the part. Such sensors reconcile the cleavage between having good spatial resolution in RTM monitoring and process costs, leading to potential benefits in a large-scale cost-driven industry.

During LCM, a preform of the part to be made is "draped" in a dedicated mould as shown in FIGS. 5A and 5B. In vacuum infusion, a vacuum bag seals the preform for a pump to create vacuum for resin injection. In RTM, a rigid top mould is used to ensure a well-controlled fibre volume content and desired thickness of the part. Distribution meshes allow resin to be evenly spread at the inlet and guided back at the outlet to a resin reservoir. The part is then cured and demoulded.

The part preform (see FIG. 5A) is made of alternated layers of fabric, whose fibres are oriented in the desired directions required for optimal mechanical properties. As the resin progresses through the mould, its flow front may not be even, due to inhomogeneities in the fabric pattern or stacking or due to the geometry of the mould. Thus, resin may reach the end of the mould in certain locations before others. The total infiltration time given by the last part or region of the mould to be infiltrated by resin may also vary. Depending on how the fabric is laid, each impregnation may be different, requiring a different control of resin infiltration and curing time.

To serve this purpose, it is proposed to integrate a multi-functional fibre between two layers of fabric, which ends up embedded in the cured part. This fibre is made by a process called thermal drawing, conventionally used in the industry for optical fibre manufacturing. A macroscopic scale-up of the final fibre, the "preform", is prepared and inserted into a furnace. Its end is heated above the glass transition temperature of the cladding to a viscosity where it can be stretched mechanically. By conservation of volume, the length generated goes with the square of the reduction in width. In the present case, the cladding or support (element) 5 is a dielectric element, which in this example is a thermoplastic (polysulfone or polycarbonate) containing carbon loaded (conducting) polymer strips and metal wires. The composite polymer strips form electrodes for capacitive and resistive sensing. $Bi_{58}Sn_{42}$ eutectic ($T_m$=139° C.) metal lines are co-drawn in contact with the conducting polymer to enhance conductivity and improve the device response time. As in the first embodiment, the fibre of the second embodiment also comprises at least two electrodes, which may be similar (but not necessarily) as the ones of the first embodiment. More specifically, as in the first embodiment, the electrodes used in the second embodiment may be composed of two components or parts: a first component 7 of polymer composite material and a second, metal component 9. A cross section of the fibre and a schematic of thermal drawing are shown in FIG. 5C. It is common in the fibre optic industry to generate kilometres of fibres in a day from a single preform, leading to low marginal costs. The proposed solution benefits from exactly the same scale and cost reduction in our case for multimaterial fibres.

FIGS. 5A to 5D summarise the fibre sensor design, fabrication and integration in vacuum-assisted resin transfer moulding (VARTM) according to the second embodiment. FIG. 5A illustrates VARTM process components. FIG. 5B illustrates VARTM process cycle. FIG. 5C shows a schematic of fibre drawing in a cylindrical furnace and micrograph of a fibre cross section. FIG. 5D illustrates embedding the proposed sensor in the part preform and resin injection. When considering the capacitive sensor design according to the second embodiment, it is relatively similar to the sensor design of the first embodiment. The difference is however that the support element 5 in the design of the second embodiment does not contain any fluid channel 3. Furthermore, the electrodes 7, 9 in the capacitive sensor 1 according to the second embodiment may be placed closer to the sensor outer surface than in the design according to the first embodiment. In fact, according to the design of the second embodiment, the electrodes may be partially longitudinally exposed, i.e. non-enclosed by the support element 5.

Figure 6:
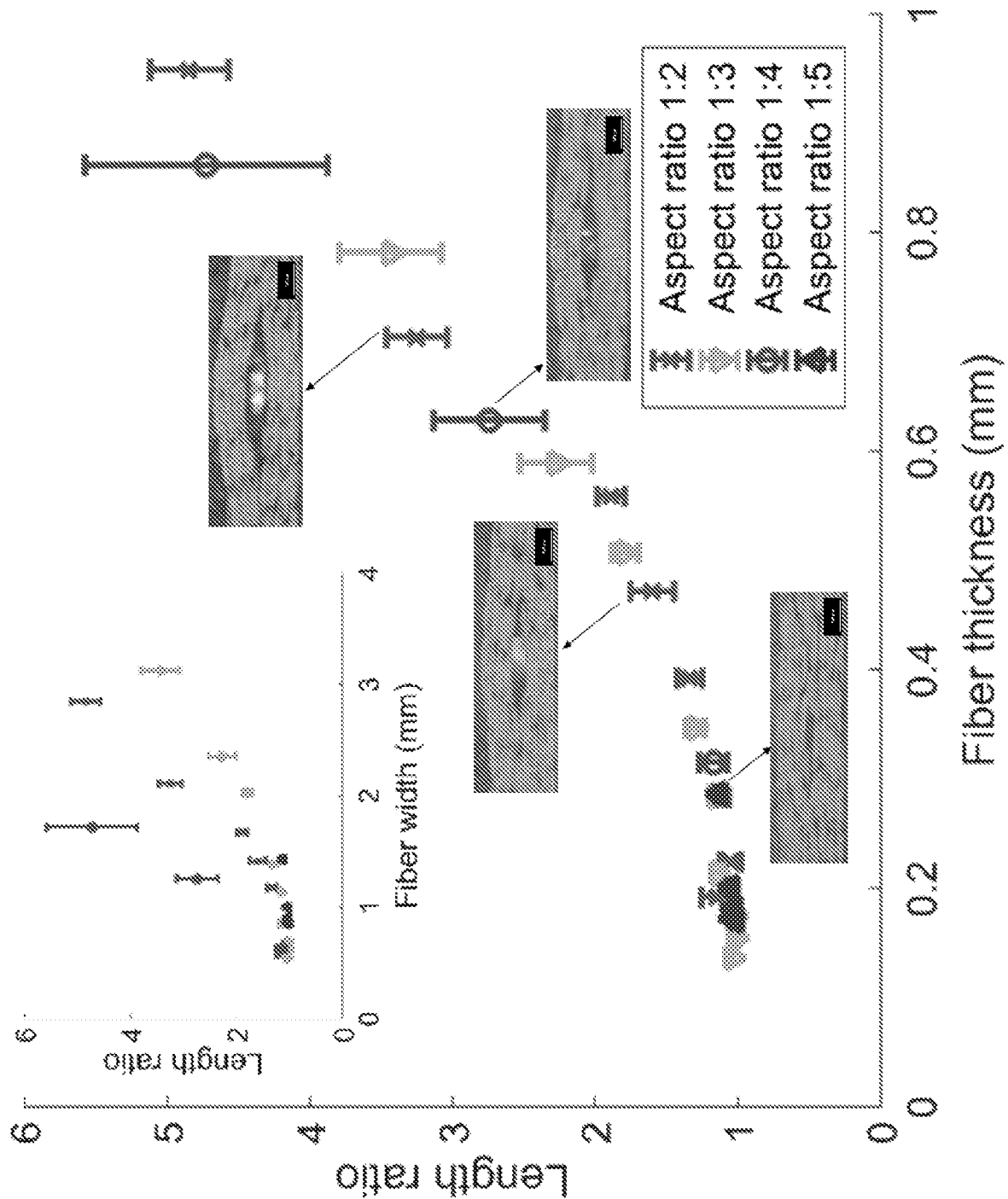
FIG. 6 illustrates how the fibre maximum length ratio of the flow front depends on fibre thickness, aspect ratio, and width (inset) in the context of the second embodiment. Micrographs of a fibre reinforced composite cross section are shown for some samples.

Once placed between plies of fabric in the part preform, the fibre may deform locally the fabric structure, which can result in resin-rich channels around the fibres in the cured part preform, detrimental to the resin front evenness, as shown in FIG. 6.

In order to quantitatively assess and minimise this effect, we define the "flow length" as the distance between a point on the flow front and the distribution mesh, and the "length ratio" at a given time as the maximum flow length on a fibre divided by the minimum flow length. This ratio is greater than 1, and equal to one if the flow front is straight and parallel to the inlet, which is the aim. We consider two parameters to affect the length ratio: the fibre width and aspect ratio. We made fibres with different aspect ratios and widths, integrated them in fibre reinforced composites (i.e. the cured or hardened part preform) and measured the maximum length ratio during impregnation. This allows us to conclude that for fibres, which are less than about 0.3 mm thick, the increase in length ratio is about 10% only or less, and that large aspect ratios (1:5 or more) are to be preferred.

Figure 7:
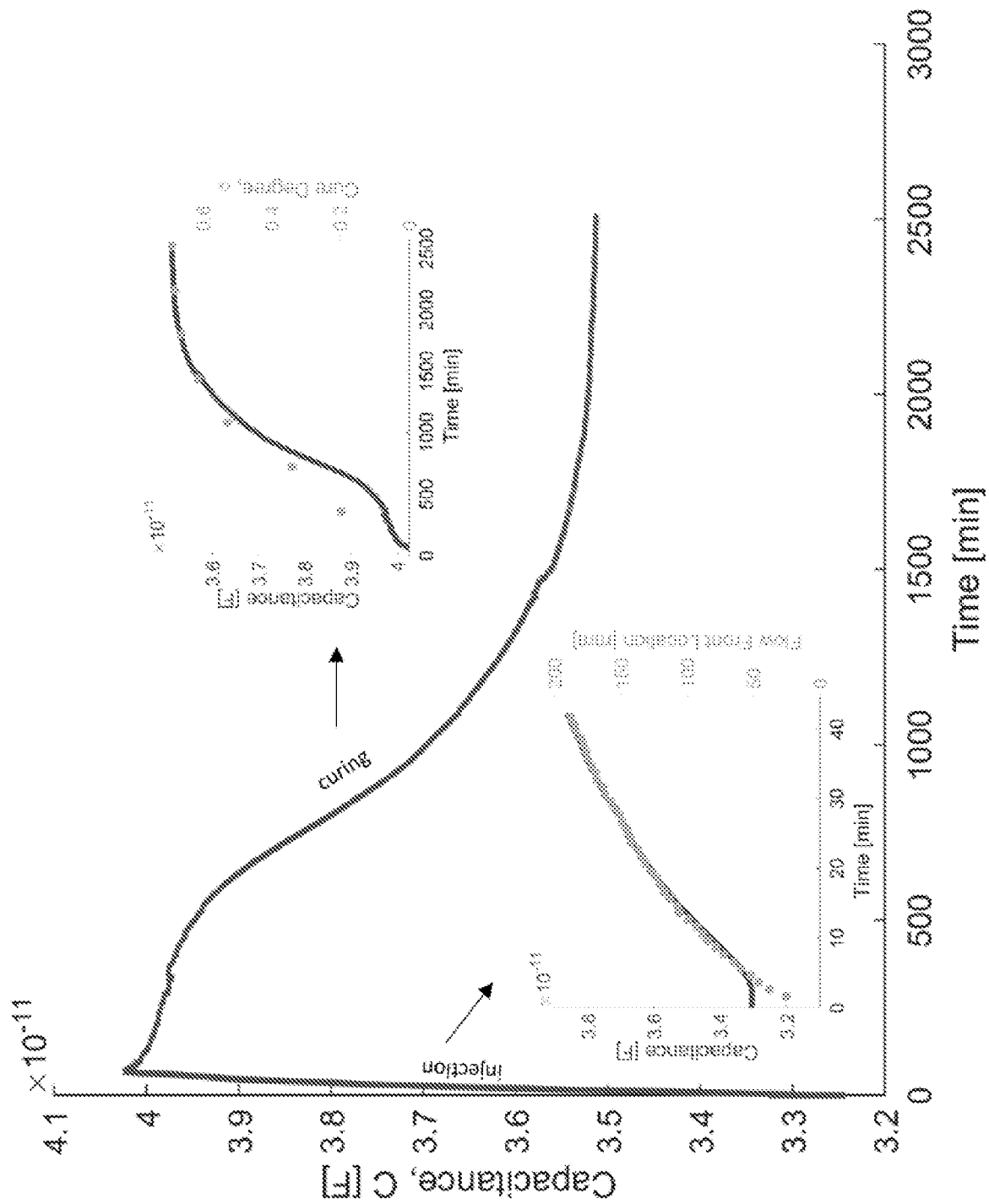
FIG. 7 shows capacitance variation during injection and curing in the context of the second embodiment. Insets show for each step how well the capacitance matches flow front location and cure degree, respectively.

The precision and relevance of the capacitive measurement for impregnation monitoring and curing are assessed next. We recorded the capacitance value during these two steps and plotted it against time in FIG. 7. The capacitance first rises as the resin penetrates and advances through the part preform, then decreases with curing as the resin changes permittivity during cross-linking. During injection, the flow front location was monitored with a ruler approximately every second. The capacitance matches very well, except for the first five minutes because the fibre had not been positioned exactly at the inlet. The capacitance only started rising once the resin reached the fibre. During curing, capacitance matches well the degree of cure (estimated with samples analysed by differential scanning calorimetry) above a cure degree of 0.5. Although there is a discrepancy below this value, what would matter in an industrial process is to know when the curing step is about to end so that one can move on to the next step/part. Also, the decrease in capacitance has a reproducible shape which could be fitted/calibrated to get the exact cure degree at all times. Also, a frequency sweep type of measurement would help to reduce the discrepancy.

Figure 8:
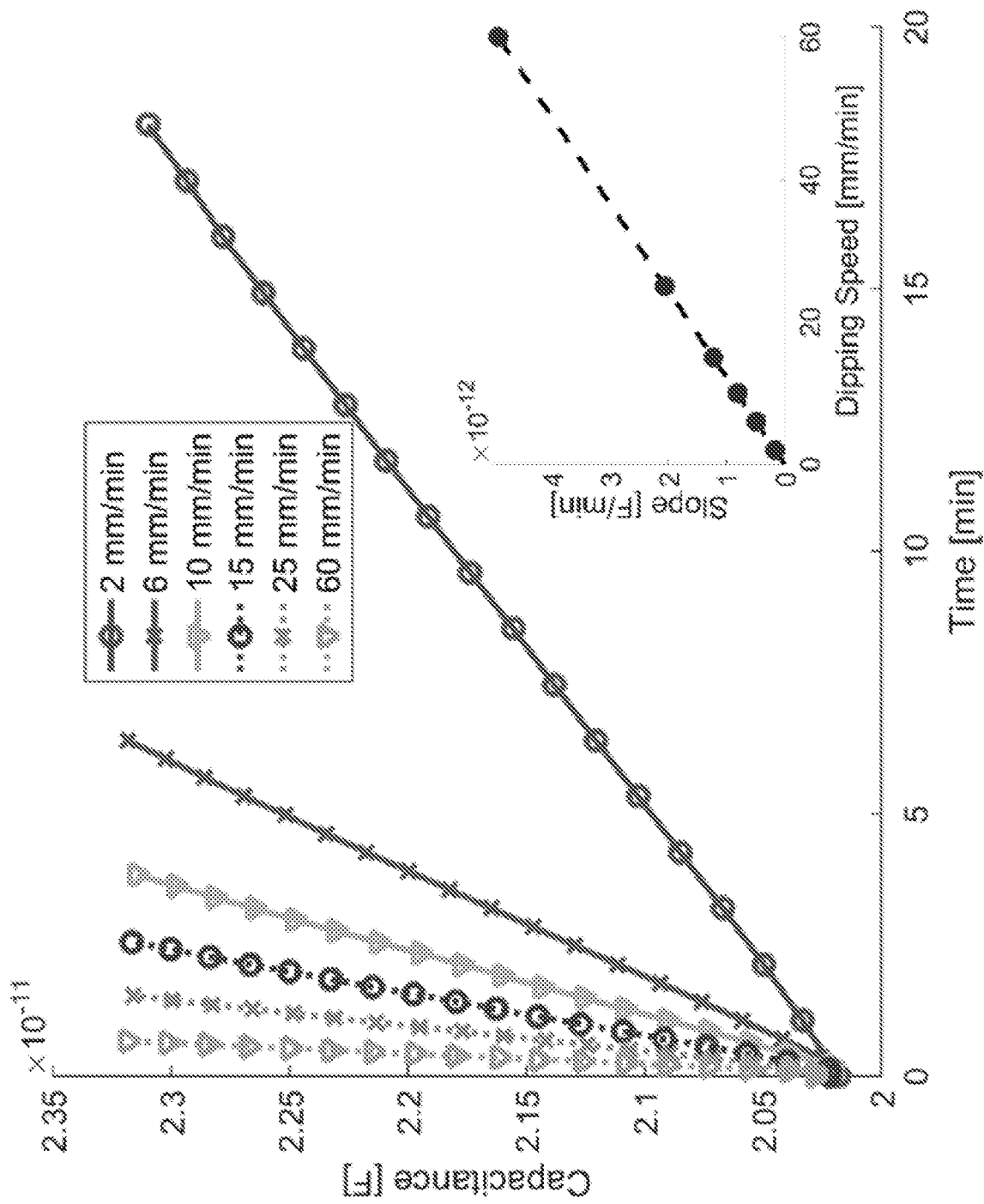
FIG. 8 shows capacitance variation over time during dipping at different speeds in the context of the second embodiment. The corresponding slopes are plotted against dipping speed in the inset, showing excellent linearity.

Coming back to impregnation, one may also be concerned about potential dynamic/inertia effects that would result in different capacitive responses depending on the resin flow rate. In particular, resin moves much faster through the preform at the beginning of the impregnation than at the end of the process. In order to tackle this doubt, we performed a dipping test of a fibre in resin at different speeds. The setup and results are shown in FIG. 8. We did not notice any effect of the dipping speed on flow front location, since the slope of capacitance versus time increased linearly with dipping speed, as expected in a model independent of the flow rate.

Examples of additional functionalities, such as resistive temperature and strain sensing, are given next. These functionalities can be easily added to the sensing fibre.

Figure 9:
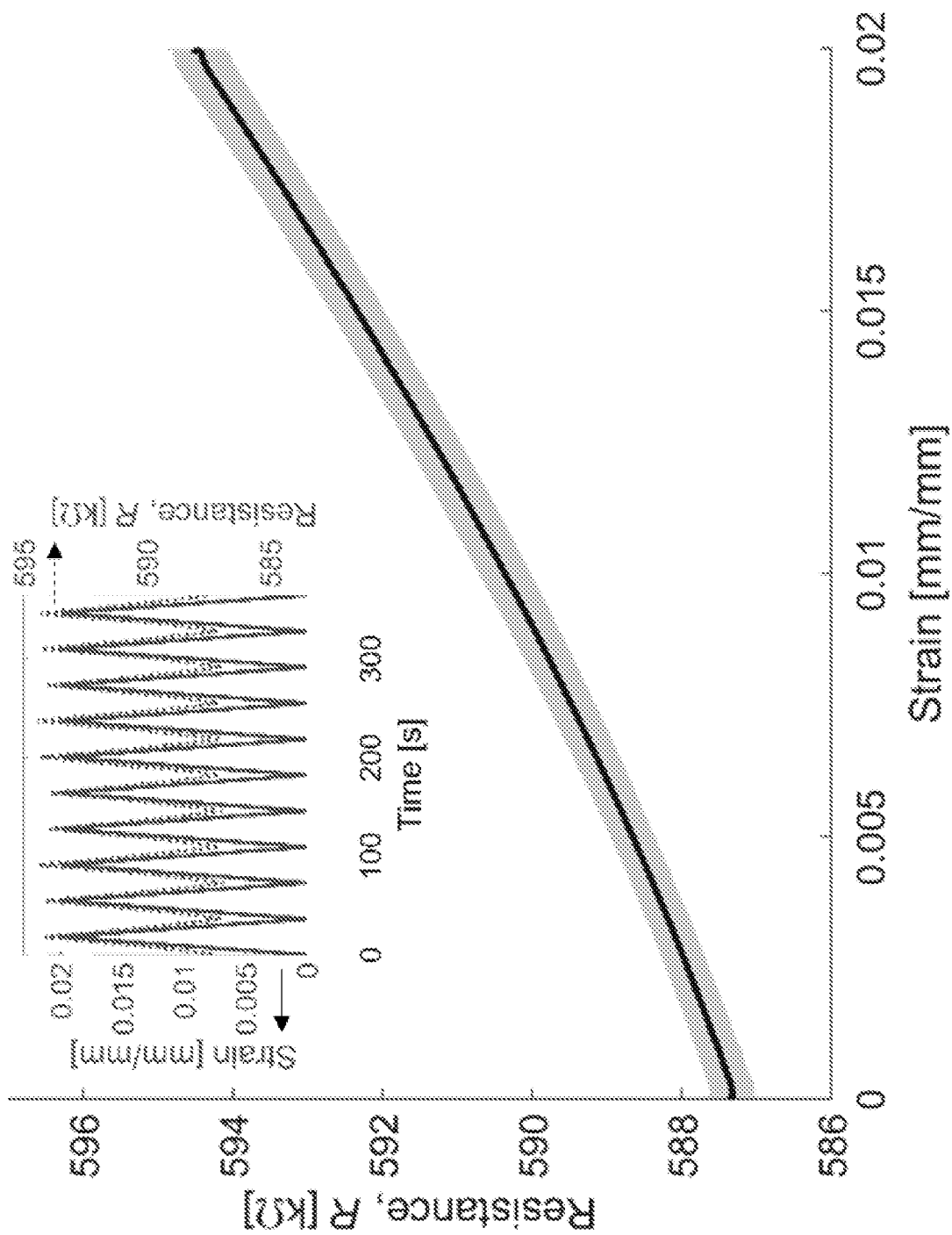
FIG. 9 shows resistance variation against strain at room temperature, with uncertainty bands in the context of the second embodiment. The inset shows the strain cycles against time over which resistance has been recorded.

The electrodes, or more specifically the carbon black-loaded conductive polymer components used for the capacitance measurement can also provide additional information. If connected from both ends of the fibre, the conductive polymer's resistivity varies with deformation and temperature. These additional functionalities come almost for free since an extra electrode (a third electrode or a resistive sensing electrode) 13 for the longitudinal resistive measurement can be co-drawn in the same fibre cladding 5. We indeed demonstrate in FIG. 9 a good dependence of resistance on strain. The maximum strain can be extended further depending on the mechanical properties of the fibre cladding (polysulfone in this case, but can be polycarbonate, acrylic, styrene-ethylene-butylene-styrene thermoplastic elastomer (SEBS) and many other drawable thermoplastics and elastomers). For the repeatability of the tensile test, we stayed in this experiment within the elastic regime of the cladding polymer and of the fibre reinforced composite.

Figure 10:
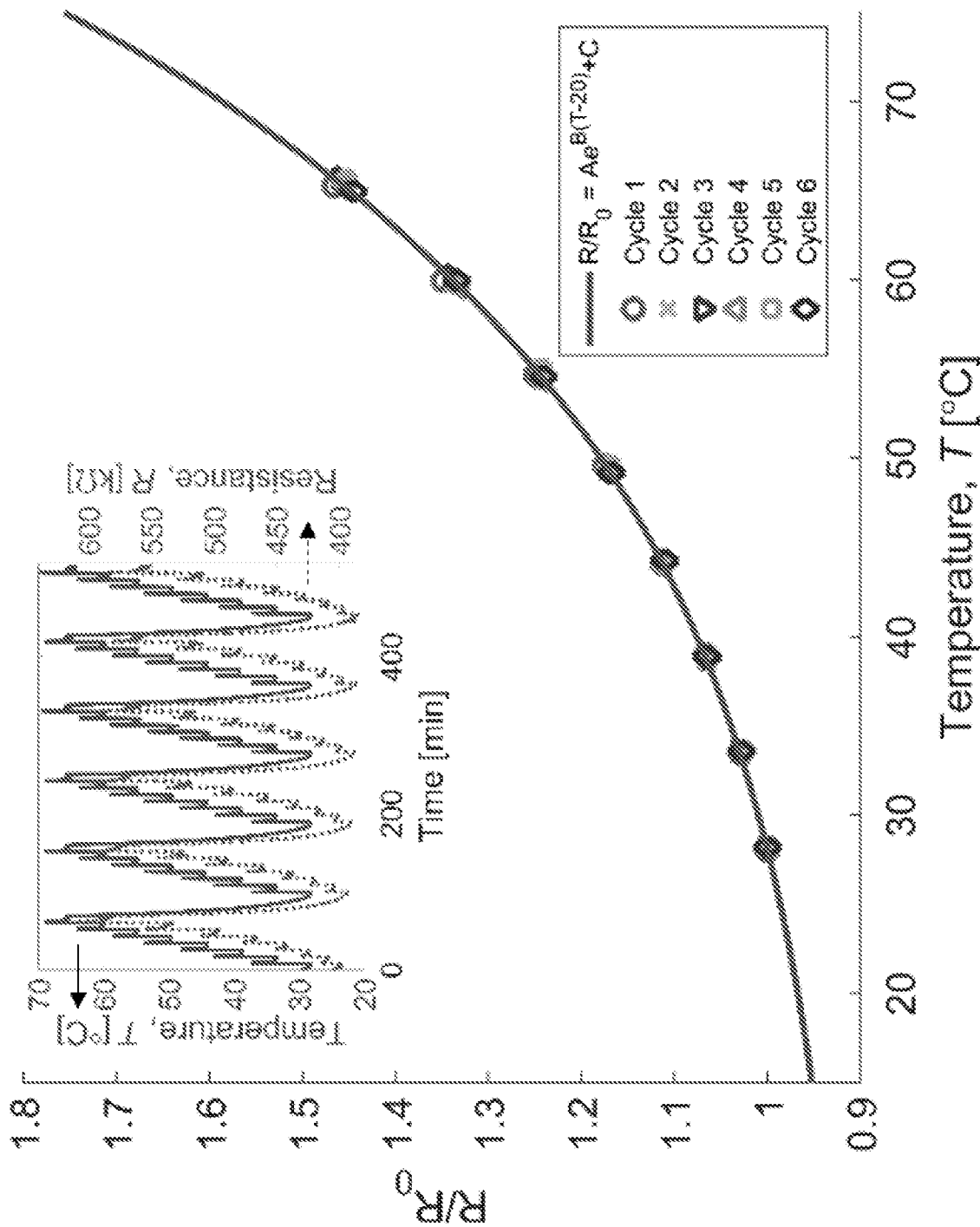
FIG. 10 illustrates fitted resistance variation against temperature (no strain), from several heating cycles shown in the inset in the context of the second embodiment. Data points are taken from the end of each dwell plateau.

We then placed the fibre in a temperature-controlled oven programmed to cycle through eight preset temperatures: from 30 to 65° C. with 5° C. steps with a five-minute dwell time, so that the composite and the fibre had time to thermalize. We recorded the value of the resistance at the end of each dwell plateau against temperature through six cycles. An exponential fit was used, based on the theory developed in "B. Chen, C. Kwok, T.-A. N. Nguyen, and Z. Wang, "Integrated Fiber Flow Sensors for Microfluidic Interconnects," Adv. Mater. Technol., vol. 3, no. 11, p. 1800175, 2018", which fitted very well experimental data. Results are plotted in FIG. 10, where R denotes the resistance to be measured, and $R_0$ denotes room temperature resistance.

Figure 11:
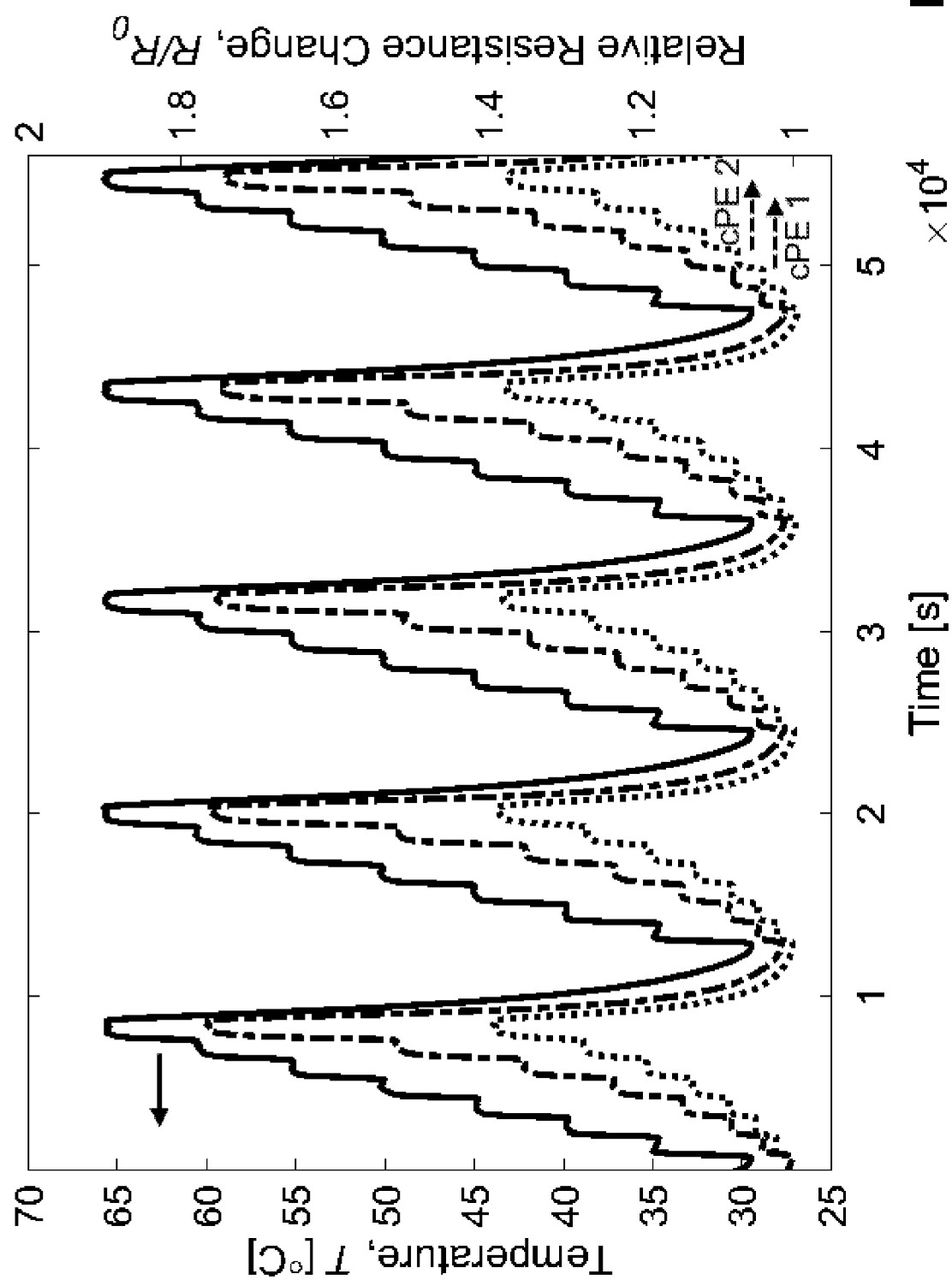
FIG. 11 illustrates normalised resistive response to temperature variations for two different carbon-loaded polyethylene (CPE) electrodes in a polysulfone cladding in the context of the second embodiment. The dependencies on temperature are different.

During manufacturing, the fibre is not much strained, so mostly temperature affects the conducting composite polymer's resistivity. However, post manufacturing, in the general case when strain and temperature vary at the same time, the conductive polymer's resistance depends on a coupled effect of both parameters. We propose two schemes for decoupling. First, we suggest embedding two resistive electrodes 13 (third and fourth electrodes) in the fibre with different dependencies on temperature and strain. The third and fourth electrodes are typically non-metallic, for example similar or identical to the first electrode components used in the first and second electrodes. However, they could be metallic elements instead. FIG. 11 shows the distinct temperature responses of two different carbon black-loaded polyethylene electrodes co-drawn in a polysulfone cladding.

If we call $f_n$ (n=1, 2) the relative resistance variation $\Delta R/R_0$ function for strain $\varepsilon$ and temperature T:

$$\begin{cases} \Delta R_1/R_{1,0} = f_1(\varepsilon, T) \\ \Delta R_2/R_{2,0} = f_2(\varepsilon, T) \end{cases} \quad (3)$$

Figure 12:
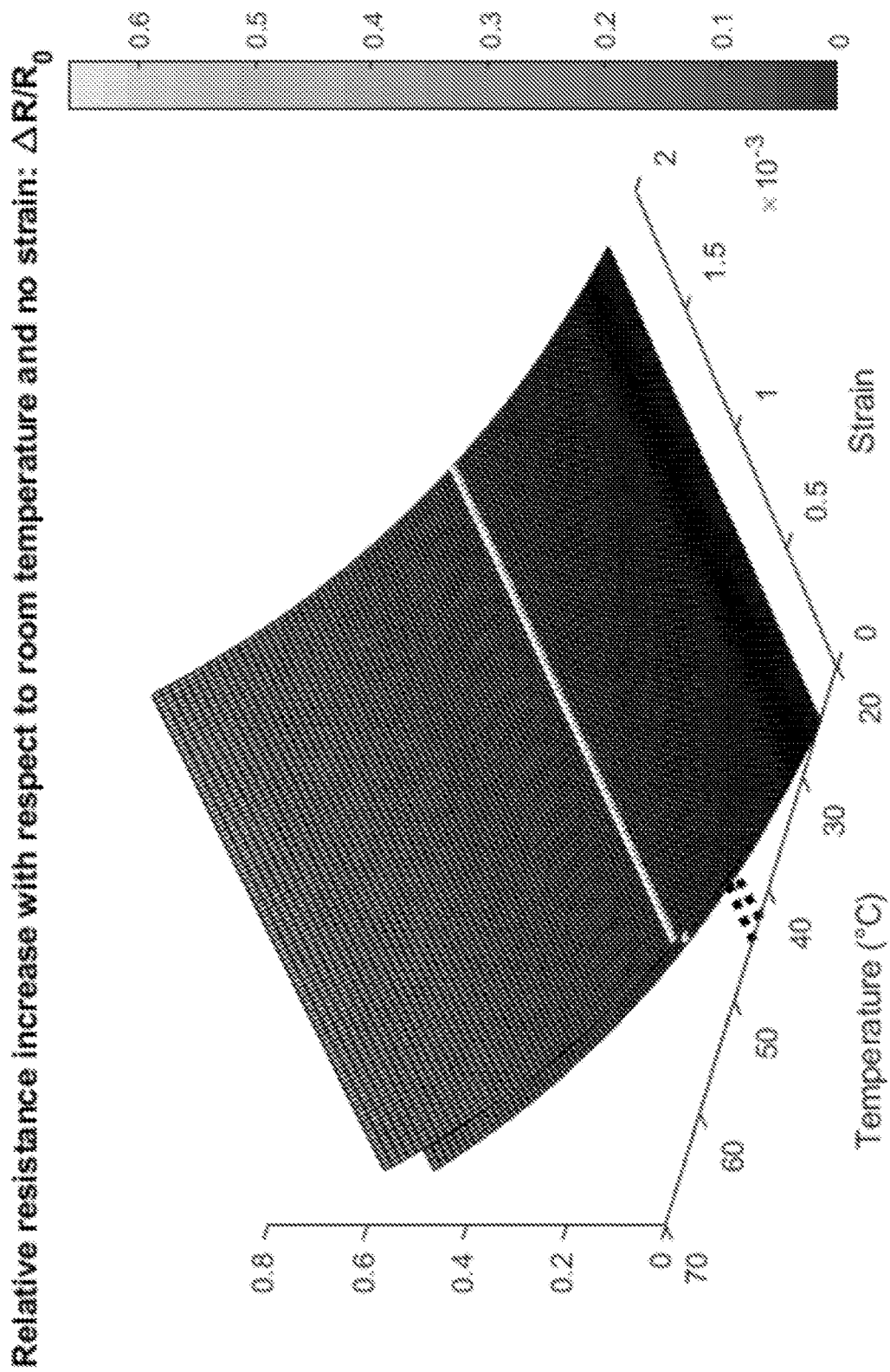
FIG. 12 illustrates a fictitious example concerning graphical resolution of a decoupling of strain and temperature measurements in the context of the second embodiment.

If $f_n$ is strictly convex (resistance increases with strain and/or temperature), we can solve numerically a two-equation system to decouple temperature and strain. $f_n$ can be fitted and interpolated from several tests scanning the $(\varepsilon, T)$ space. For each electrode measurement (white line in FIG. 12), several $(\varepsilon, T)$ couples would correspond to such a resistance value (dotted line, i.e. projection of the white line on the $\Delta R/R_0=0$ plane). For two different conductive polymers, only one $(\varepsilon, T)$ solution remains (the two dotted lines intersect). FIG. 12 shows a fictitious example regarding graphical resolution of the decoupling. Each surface represents one interpolated and fitted electrode resistance dependence on $(\varepsilon, T)$. The white line represents a measured resistance value for each electrode. The $(\varepsilon, T)$ couples that could correspond are the dotted lines (projection of the white lines in the R=0 plane). The estimated $(\varepsilon, T)$ solution is read at the intersection of dotted lines.

One could argue in the same manner for similar materials (as in the example of two CPEs), since the temperature coefficient of resistance (TCR) and gauge factor (GF, also called strain factor) are similar, interpolation and measurement uncertainty combined will result in a considerable uncertainty on $\varepsilon$ and T after decoupling. Graphically, this would mean that the dotted lines, actually strips, would be close and their overlap (potential solutions) large.

Figure 13:
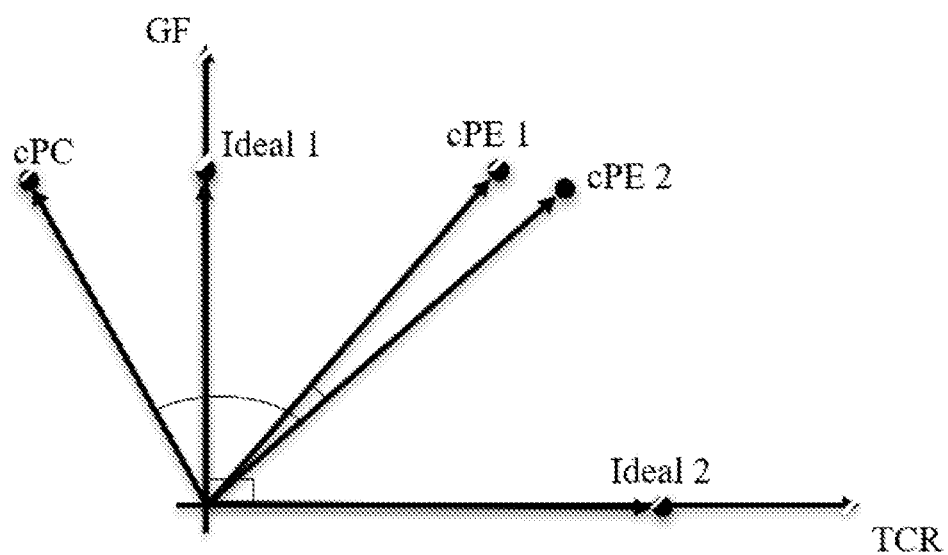
FIG. 13 shows a plot in the "gauge factor (GF) vs temperature coefficient of resistance (TCR)" space and example materials for linear dependencies. The cross product of two different CPEs is small, compared with ideal materials.
Figure 14:
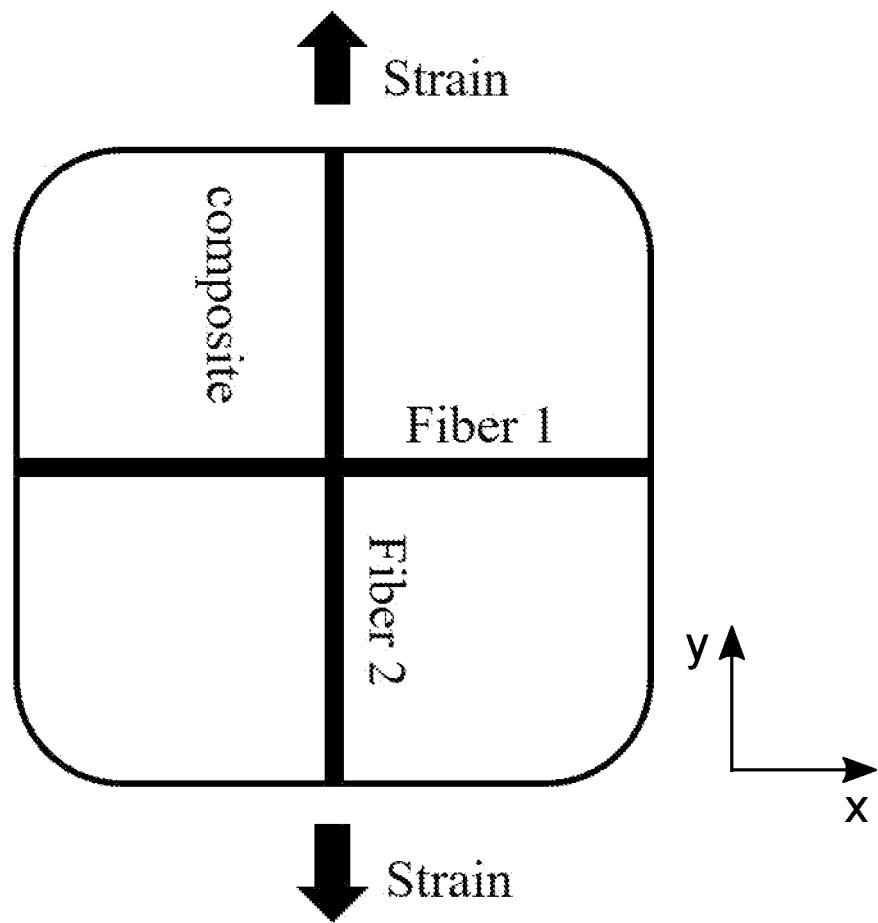
FIG. 14 shows a schematic of a fibre geometry that enables decoupling strain and temperature, given uniaxial strain along one fibre.

We can reduce this uncertainty though, by choosing materials that have dissimilar behaviours. An ideal case, for instance, would be to have one material sensitive to strain only (and not temperature), and one to temperature only (not strain). For constant GF and TCR, these theoretical materials would be orthogonal in the (GF, TCR) space, as opposed to similar materials which would be almost colinear, as shown in FIG. 13. It can be shown that for a given TCR, the uncertainty on strain estimation, i.e. $\sigma_\varepsilon$, is minimised when the cross product between $$\overrightarrow{(GF_1, TCR_1)} \times \overrightarrow{(GF_2, TCR_2)}$$

is maximised. In practice, conductive polymers are always sensitive to temperature changes, be it by thermal expansion only. By tuning drawing parameters, we managed to get a negative GF (for carbon-loaded polycarbonate (CPC), thus achieving a reduced uncertainty on strain and temperature estimation (for the CPE/CPC couple).

Another strategy is to decouple the fibres spatially. Assuming that the composite part will be strained in orthogonal directions only, one at a time, one fibre at a time only should be strained. We can then infer temperature from the relative resistance increase from one fibre (orthogonal to strain) and conclude on strain with the other (parallel to strain).

To summarise, the second embodiment proposed a new fibre sensor 1 and method for RTM monitoring that is at the heart of the part preform, can cover its entire length (or only part of it) with little wiring, and can be easily adapted to any preform. It is based on multifunctional thermally-drawn fibres, which are encapsulated in a polymer matrix and act as capacitive and resistive sensors. Building on the cost efficiency of conventional optical fibre drawing, the process is extremely scalable, allowing functional fibres of extended length to be manufactured in a short time. It was demonstrated the possibility of embedding them between fabric plies for flow front tracking, as well as cure degree and temperature sensing, with minimal impact to flow length. The sensing capacity remains effective in the part after processing, and it was described two ways to simultaneously monitor strain and temperature. It is believed that this innovative approach provides insights and optimisation to liquid composite moulding processes at large, cuts costs, and functionalises materials for a wide range of manufacturing, namely the automotive and aeronautic industries, wind turbine blades or the marine industries, for instance.

As described in connection with the above embodiments, the present invention in one aspect proposes an elongated capacitive sensor 1. The sensor comprises: a fibre-like support 5 made of a dielectric material or dielectric composite material; and a first electrode 7, 9 and a second electrode 7, 9 arranged in the support 5 longitudinally along the support 5, the first and second electrodes forming together with the support a capacitive sensing element whose capacitance is dependent upon a dielectric constant (or electrical properties more broadly) of one or more materials inside the support and/or outside the support, and/or is dependent upon a change of an overall or combined dielectric constant of materials (or a change of configuration of one or more materials and associated change of electrical properties more broadly) inside the support and/or outside the support. The material or materials affecting the capacitance may or may not be in intimate or direct contact with the capacitive sensor. Thus, if the capacitive sensor 1 is used for fluid monitoring, then the capacitance of the capacitive sensing element is dependent upon a fluid flow inside the fibre support and/or outside the fibre support.

While the invention has been illustrated and described in detail in the drawings and foregoing description, such illustration and description are to be considered illustrative or exemplary and not restrictive, the invention being not limited to the disclosed embodiments. Other embodiments and variants are understood, and can be achieved by those skilled in the art when carrying out the claimed invention, based on a study of the drawings, the disclosure and the appended claims. Further embodiments may be obtained by combining any of the above teachings.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. An elongated capacitive sensor, the sensor comprising:
   a fibre-like support made of a dielectric material or dielectric composite material; and
   a first electrode and a second electrode arranged in the support longitudinally along the support, the first and second electrodes forming together with the support a capacitive sensing element whose capacitance is dependent upon one or more electrical properties of one or more materials inside the support and/or outside the support, and/or is dependent upon a change of materials configuration and associated overall change of one or more electrical properties inside the support and/or outside the support;
   wherein the first and second electrodes are embedded in the support such that they are longitudinally fully enclosed by the support, and
   wherein the support comprises a fluid channel designed to allow a fluid to flow in the fluid channel, and wherein the fluid channel extends within the support longitudinally from a first support end to a second, opposite support end.

2. The capacitive sensor according to claim 1, wherein the capacitive sensor is flexible.

3. The capacitive sensor according to claim 1, wherein the support is made of thermoplastic polymer and/or elastomer, and in particular of polycarbonate and/or polysulfone.

4. The capacitive sensor according to claim 1, wherein the first and/or second electrode(s) comprise(s) a first electrode component and a second, different electrode component.

5. The capacitive sensor according to claim 4, wherein the first electrode component is a conductive polymer element, and the second electrode component is a metallic element.

6. The capacitive sensor according to claim 4, wherein the first electrode component is made of a carbon-loaded polyethylene and/or a carbon-loaded polycarbonate.

7. The capacitive sensor according to claim 4, wherein the first electrode component has a greater cross-sectional area than the second electrode component, the cross-sectional area being measured substantially orthogonally to a length axis of the capacitive sensor.

8. The capacitive sensor according to claim 1, wherein the fluid channel has a maximum cross-sectional diameter of at most 2 mm, or more specifically, at most 0.1 mm or 0.01 mm.

9. The capacitive sensor according to claim 1, wherein the first and/or second electrodes is/are arranged on the outer surface of the support such the first and/or second electrode(s) is/are at least partially longitudinally non-enclosed by the support.

10. The capacitive sensor according to claim 1, wherein the capacitive sensing element is configured to be used for fluid monitoring.

11. The capacitive sensor according to claim 1, wherein the support further comprises a third electrode whose resistivity is temperature-dependent and/or strain-dependent to allow the capacitive sensor to also measure temperature and/or strain.

12. The capacitive sensor according to claim 1, wherein the support further comprises a third electrode whose resistivity is temperature- and/or strain-dependent to allow the capacitive sensor to measure temperature, and wherein the support further comprises a fourth electrode whose resistivity is temperature- and/or strain-dependent to allow the capacitive sensor to measure strain, the third electrode having different dependencies on temperature and strain than the fourth electrode.

13. The capacitive sensor according to claim 1, wherein the one or more electrical properties comprise a dielectric constant.

14. A capacitive sensor system comprising the capacitive sensor according to claim 1, and further comprising a measurement circuit, and in particular an impedance analyser connected between the first and second electrodes.

15. The capacitive sensor system according to claim 14, wherein the capacitive sensor system further comprises a processing circuit for determining a fluid flow rate and/or fluid dielectric constant based on a capacitance value of the capacitive sensing element.

16. A method of fabricating a fibre capacitive sensor for fluid monitoring, the method comprising:
    making a preform comprising a support made of dielectric material or dielectric composite material, the preform further comprising a first electrode and a second electrode arranged in the support and longitudinally along the support, the first and second electrodes forming together with the support a capacitive sensing element whose capacitance is dependent upon one or more electrical properties of one or more materials inside the support and/or outside the support, and/or is dependent upon a change of materials configuration and associated overall change of one or more electrical properties inside the support and/or outside the support, the first and second electrodes being embedded in the support such that they are longitudinally fully enclosed by the support;
    placing the preform into a draw tower;

heating the preform over its glass transition temperature; and stretching the preform while maintaining the composition and cross-sectional architecture of the preform to obtain the fibre capacitive sensor;

wherein the support comprises a fluid channel designed to allow a fluid to flow in the fluid channel, and wherein the fluid channel extends within the support longitudinally from a first support end to a second, opposite support end.

17. A method according to claim 16, wherein the making of the preform further comprises integrating at least a third electrode and/or another functional element in or on the support for sensing a given property.

* * * * *